US008156042B2

(12) United States Patent
Winkelman, III et al.

(10) Patent No.: US 8,156,042 B2
(45) Date of Patent: Apr. 10, 2012

(54) METHOD AND APPARATUS FOR AUTOMATICALLY RELOADING A STORED VALUE CARD

(75) Inventors: Nathaniel W. Winkelman, III, Mercer Island, WA (US); Susan E. Flannery, Seattle, WA (US); Daniel C. White, Seattle, WA (US); Margaret A. Nyland, Auburn, WA (US); Evan D. Klopp, Seattle, WA (US); Thomas R. FitzMacken, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 840 days.

(21) Appl. No.: 10/926,779

(22) Filed: Aug. 26, 2004

(65) Prior Publication Data

US 2005/0125317 A1    Jun. 9, 2005

Related U.S. Application Data

(60) Provisional application No. 60/499,108, filed on Aug. 29, 2003.

(51) Int. Cl.
*G06Q 40/00* (2006.01)
*G06K 5/00* (2006.01)
*G06K 19/06* (2006.01)

(52) U.S. Cl. ............... 705/39; 705/14; 705/37; 705/38; 705/40; 705/41; 235/380; 235/492

(58) Field of Classification Search ............. 705/37–41, 705/14; 235/380, 492
See application file for complete search history.

(56) References Cited

U.S. PATENT DOCUMENTS

| 4,973,828 | A | * | 11/1990 | Naruse et al. ............... 235/380 |
|---|---|---|---|---|
| 5,025,138 | A | | 6/1991 | Cuervo |
| 5,223,699 | A | | 6/1993 | Flynn |
| 5,276,311 | A | | 1/1994 | Hennige |
| 5,409,092 | A | | 4/1995 | Itako et al. |
| 5,440,108 | A | | 8/1995 | Tran et al. |
| 5,506,393 | A | | 4/1996 | Ziarno |
| 5,521,966 | A | | 5/1996 | Friedes |
| 5,577,109 | A | | 11/1996 | Stimson et al. |
| 5,578,808 | A | | 11/1996 | Taylor |

(Continued)

FOREIGN PATENT DOCUMENTS

CN    1384652 A    5/2001

(Continued)

OTHER PUBLICATIONS

Merchants Grapple With Payment Options—Integration still a hurdle as credit-card alternatives emerge L. Scott Tillett. InternetWeek. Manhasset: May 22, 2000. , Iss. 814.*

(Continued)

*Primary Examiner* — William Rankins

(74) *Attorney, Agent, or Firm* — Knobbe Martens Olson & Bear LLP

(57) ABSTRACT

To facilitate the sale of merchandise using a stored value card (SVC), a method and system are provided to automatically reload an SVC in accordance with automatic reload preferences associated with the SVC account. The preferences include the pre-authorized reload amount, payment method, and the circumstances under which to automatically reload the SVC with the pre-authorized reload amount. The preferences are previously specified by a party associated with the SVC when setting up the automatic reload option. The party is notified when the automatic reload occurs.

40 Claims, 10 Drawing Sheets

U.S. PATENT DOCUMENTS

| | | | |
|---|---|---|---|
| 5,590,038 A | | 12/1996 | Pitroda |
| 5,684,291 A | | 11/1997 | Taskett |
| 5,689,100 A | | 11/1997 | Carrithers et al. |
| 5,696,908 A | | 12/1997 | Muehlberger et al. |
| 5,704,046 A | * | 12/1997 | Hogan ............................ 705/39 |
| 5,744,787 A | * | 4/1998 | Teicher ........................ 235/380 |
| 5,819,234 A | | 10/1998 | Slavin et al. |
| 5,844,230 A | | 12/1998 | Lalonde |
| 5,923,016 A | | 7/1999 | Fredregill et al. |
| 5,937,391 A | | 8/1999 | Ikeda et al. |
| 5,953,710 A | | 9/1999 | Fleming |
| 5,956,695 A | | 9/1999 | Carrithers et al. |
| 5,969,318 A | | 10/1999 | Mackenthun |
| 5,991,413 A | | 11/1999 | Arditti et al. |
| 5,991,748 A | | 11/1999 | Taskett |
| 6,000,608 A | | 12/1999 | Dorf |
| 6,032,136 A | | 2/2000 | Brake, Jr. et al. |
| 6,032,859 A | | 3/2000 | Muehlberger et al. |
| 6,038,552 A | | 3/2000 | Fleischl et al. |
| 6,044,362 A | | 3/2000 | Neely |
| 6,105,009 A | | 8/2000 | Cuervo |
| 6,138,911 A | | 10/2000 | Fredregill et al. |
| 6,152,365 A | | 11/2000 | Kolls |
| 6,167,387 A | | 12/2000 | Lee-Wai-Yin |
| 6,167,389 A | | 12/2000 | Davis et al. |
| 6,189,787 B1 | | 2/2001 | Dorf |
| 6,193,155 B1 | | 2/2001 | Walker et al. |
| 6,199,757 B1 | | 3/2001 | Kubert |
| 6,282,566 B1 | | 8/2001 | Lee, Jr. et al. |
| 6,330,978 B1 | | 12/2001 | Molano et al. |
| 6,375,073 B1 | | 4/2002 | Aebi et al. |
| 6,405,182 B1 | | 6/2002 | Cuervo |
| 6,405,930 B1 | | 6/2002 | Kubert |
| 6,427,909 B1 | | 8/2002 | Barnes et al. |
| 6,484,147 B1 | | 11/2002 | Brizendine et al. |
| 6,502,745 B1 | | 1/2003 | Stimson et al. |
| 6,561,416 B2 | | 5/2003 | Kubert et al. |
| 6,575,361 B1 | | 6/2003 | Graves et al. |
| 6,581,845 B2 | | 6/2003 | Ye |
| 6,594,640 B1 | | 7/2003 | Postrel |
| 6,612,487 B2 | | 9/2003 | Tidball et al. |
| 6,615,189 B1 | | 9/2003 | Phillips et al. |
| 6,615,190 B1 | | 9/2003 | Slater |
| 6,631,849 B2 | | 10/2003 | Blossom |
| 6,655,587 B2 | | 12/2003 | Andrews et al. |
| 6,685,088 B1 | | 2/2004 | Royer et al. |
| 6,700,961 B1 | | 3/2004 | Dacloush et al. |
| 6,705,518 B2 | | 3/2004 | Park et al. |
| 6,915,277 B1 | | 7/2005 | Manchester et al. |
| 7,083,084 B2 | | 8/2006 | Graves et al. |
| 7,101,512 B2 | | 9/2006 | Hahs |
| 7,130,828 B2 | | 10/2006 | Phillips et al. |
| 7,406,442 B1 | | 7/2008 | Kottmeier et al. |
| 7,430,521 B2 | | 9/2008 | Walker et al. |
| 2001/0001321 A1 | | 5/2001 | Resnick et al. |
| 2001/0047342 A1 | | 11/2001 | Cuervo |
| 2001/0048023 A1 | | 12/2001 | Fitzmaurice et al. |
| 2001/0054003 A1 | | 12/2001 | Chien et al. |
| 2002/0022966 A1 | | 2/2002 | Horgan |
| 2002/0026418 A1 | | 2/2002 | Koppel et al. |
| 2002/0049631 A1 | | 4/2002 | Williams |
| 2002/0052838 A1 | | 5/2002 | Yamada et al. |
| 2002/0066783 A1 | | 6/2002 | Sawin |
| 2002/0069122 A1 | | 6/2002 | Yun et al. |
| 2002/0091572 A1 | | 7/2002 | Anderson et al. |
| 2002/0116324 A1 | | 8/2002 | Macias |
| 2002/0138343 A1 | | 9/2002 | Weatherford et al. |
| 2002/0138428 A1 | | 9/2002 | Spear |
| 2002/0145051 A1 | | 10/2002 | Charrin |
| 2002/0152123 A1 | | 10/2002 | Giordano et al. |
| 2002/0152124 A1 | | 10/2002 | Guzman et al. |
| 2002/0152168 A1 | * | 10/2002 | Neofytides et al. ............. 705/44 |
| 2002/0161705 A1 | | 10/2002 | Khan et al. |
| 2002/0174016 A1 | | 11/2002 | Cuervo |
| 2002/0174019 A1 | | 11/2002 | Henderson et al. |
| 2003/0007615 A1 | | 1/2003 | Parfait et al. |
| 2003/0015589 A1 | | 1/2003 | Jimenez |
| 2003/0023549 A1 | | 1/2003 | Armes et al. |
| 2003/0055780 A1 | | 3/2003 | Hansen et al. |
| 2003/0055782 A1 | | 3/2003 | Slater |
| 2003/0061157 A1 | | 3/2003 | Hirka et al. |
| 2003/0066783 A1 | | 4/2003 | Butler et al. |
| 2003/0085272 A1 | * | 5/2003 | Andrews et al. ............. 235/380 |
| 2003/0088462 A1 | | 5/2003 | Carrithers et al. |
| 2003/0101131 A1 | * | 5/2003 | Warren et al. ................... 705/38 |
| 2003/0111527 A1 | | 6/2003 | Blossom |
| 2003/0130940 A1 | | 7/2003 | Hansen et al. |
| 2003/0135462 A1 | | 7/2003 | Brake, Jr. et al. |
| 2003/0138343 A1 | | 7/2003 | Matsui et al. |
| 2003/0144935 A1 | | 7/2003 | Sobek |
| 2003/0149664 A1 | | 8/2003 | Haeno et al. |
| 2003/0154163 A1 | | 8/2003 | Phillips et al. |
| 2003/0157925 A1 | | 8/2003 | Sorber et al. |
| 2003/0158818 A1 | | 8/2003 | George et al. |
| 2003/0195849 A1 | | 10/2003 | Phillips et al. |
| 2003/0205616 A1 | | 11/2003 | Graves et al. |
| 2003/0209608 A1 | | 11/2003 | Blossom |
| 2003/0212796 A1 | * | 11/2003 | Willard ........................ 709/227 |
| 2003/0222136 A1 | | 12/2003 | Bolle et al. |
| 2003/0236704 A1 | | 12/2003 | Antonucci |
| 2003/0236755 A1 | | 12/2003 | Dagelet, Jr. |
| 2004/0006536 A1 | | 1/2004 | Kawashima et al. |
| 2004/0007618 A1 | | 1/2004 | Oram et al. |
| 2004/0010449 A1 | * | 1/2004 | Berardi et al. ................... 705/16 |
| 2004/0024672 A1 | | 2/2004 | Brake, Jr. et al. |
| 2004/0050928 A1 | | 3/2004 | Bishop et al. |
| 2004/0064412 A1 | | 4/2004 | Phillips et al. |
| 2004/0117300 A1 | | 6/2004 | Jones et al. |
| 2004/0122736 A1 | * | 6/2004 | Strock et al. ................... 705/14 |
| 2004/0133440 A1 | * | 7/2004 | Carolan et al. ................... 705/1 |
| 2004/0172362 A1 | | 9/2004 | Hausmann et al. |
| 2004/0186773 A1 | * | 9/2004 | George et al. ................... 705/14 |
| 2005/0027648 A1 | | 2/2005 | Knowles et al. |
| 2005/0055296 A1 | | 3/2005 | Hattersley et al. |
| 2005/0091116 A1 | | 4/2005 | Monk |
| 2005/0114217 A1 | | 5/2005 | Monk |
| 2006/1006437 | | 3/2006 | Doran et al. |
| 2006/1016194 | | 7/2006 | Laksono et al. |

FOREIGN PATENT DOCUMENTS

| | | | |
|---|---|---|---|
| GB | 2376787 A | | 12/2002 |
| GB | 2377071 A | | 12/2002 |
| GB | 2377314 A | | 1/2003 |
| JP | 04-070993 | | 3/1992 |
| JP | 08-083309 | | 3/1996 |
| JP | 011-259577 | | 9/1999 |
| JP | 2001-236529 | | 8/2001 |
| JP | 2002-373303 A | | 12/2002 |
| JP | 2003-091670 A | | 3/2003 |
| JP | 2003-115018 A | | 4/2003 |
| JP | 2003-132283 A | | 5/2003 |
| JP | 2003-151011 | | 5/2003 |
| RU | 2150147 C1 | | 5/2000 |
| WO | WO99/03057 | | 1/1999 |
| WO | 0049551 A1 | | 8/2000 |
| WO | 0247022 A1 | | 6/2002 |
| WO | 02102133 A2 | | 12/2002 |
| WO | 03071389 A2 | | 8/2003 |
| WO | 03088078 A2 | | 10/2003 |
| WO | 2004154019 A1 | | 7/2004 |
| WO | 2004093022 A1 | | 10/2004 |
| WO | WO 2005/033997 | | 4/2005 |

OTHER PUBLICATIONS

Fast Lane FAQ, http:www.mtafastlane.com/content/faq/answers.html.

Visa International Launches Major Smart Card program in Leading Shopping and Entertainment District in Tokyo, PR Newswire, Jul. 15, 1998.

"A Versatile Holiday Gift—The Starbucks Card," 2002.

E-Z Pass Online Application, https://ezpass.csc.paturnpike.com/paturnpike/defaultasp.

E-Z Pass Peace Bridge Authority Customer Service Center, https://www.pbaezpass.com/getez.

Speedpass: How It Works, http://www.speedpass.com/how/index.jsp.

"Starbucks Adds Personal Touch to the Starbucks Card," Seattle, WA, Dec. 12, 2002.

"Starbucks Brings Customer Service to New Heights for Starbucks Card Users," Seattle, WA, Jul. 9, 2002.

"Starbucks Cards Deals Customers a Winning Hand," Seattle, WA, Nov. 27, 2001.

"Starbucks Commitment to Jumpstart Helps Open Eight New Sites in Next Six Months," Seattle, WA, Mar. 27, 2002.

Starbucks Holiday Product Fact Sheet, Nov. 2002.

"Starbucks Japan Launches Card Program Using ValueLink's Program," Denver, CO, Jan. 22, 2003.

"Starbucks Launches New Automatic Reload Option for Starbucks Card," Seattle, WA, Sep. 17, 2002.

* cited by examiner

METHOD AND APPARATUS FOR AUTOMATICALLY RELOADING A STORED VALUE CARD

CROSS-REFERENCE TO RELATED APPLICATION

This application claims the benefit of Provisional Application No. 60/499,108, filed Aug. 29, 2003, the benefit of which is hereby claimed under 35 U.S.C. §119.

FIELD OF THE INVENTION

The present invention relates generally to enhancing the use of a stored value card for both the merchant and the purchaser. More specifically, the present invention relates to automatically reloading an account associated with a stored value card with additional funds.

BACKGROUND OF THE INVENTION

A stored value card (SVC) is a card that is presented by a purchaser to a merchant to purchase merchandise at a point of sale (POS) location in lieu of cash, credit card, or other payment method. The SVC card is associated with a pre-paid account having a cash balance. Each time the SVC card is presented at the POS, the account is debited by the amount of the sale. When the cash balance is depleted, the card is typically discarded by the purchaser or card holder.

The SVC card is beneficial to the purchaser as it provides the convenience of a credit or debit card without having to maintain a credit or checking account at a financial institution. The SVC card is also beneficial to the merchant, since it facilitates the sale of merchandise using existing POS systems, and is generally faster and more secure than cash or paper check transactions.

The SVC card has other advantages as well, such as enabling the tracking of purchases by particular purchasers for marketing or incentive programs. For example, instead of providing a paper-based frequent purchaser card, a merchant can automatically track the number or dollar amount of purchases made with a particular SVC card, and reward the purchaser with free or discounted merchandise after making a certain number of purchases or reaching a certain dollar amount.

Nevertheless, the SVC card has its limitations. For example, the purchaser may present the SVC card without realizing that the cash balance is insufficient to complete his or her purchase. If the purchaser cannot provide another form of payment, the sale may be lost. Even if the purchaser can provide another form of payment, the transaction for the sale takes longer, inconveniencing the purchaser and other waiting customers. The purchaser may also fail to get incentive program credit for the purchase that might otherwise have been made using his or her SVC card.

SUMMARY OF THE INVENTION

A method is provided to automatically reload a stored value card (SVC). In one embodiment, after determining that an event related to an SVC has occurred, a balance of an account associated with the SVC is automatically incremented by an amount authorized by the customer. The event may be one or a combination of events, such as a balance that has fallen below a threshold level, or the arrival of a predetermined date on which automatic reloading is to occur. In one embodiment, the holder of the SVC is automatically notified that the balance has been incremented. An apparatus and system are also provided to carry out the method.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

To facilitate the sale of merchandise using an SVC, a method, apparatus and system are provided to automatically reload an SVC account associated with the SVC in accordance with previously specified data associated with the SVC account. The data include, but are not limited to, pre-authorized reload amounts, payment method, and triggering events. Reloading an SVC entails purchasing additional dollar amounts or "value," which are added to the existing SVC account.

In the following paragraphs, various aspects and embodiments of the method, apparatus and system will be described. Specific details will be set forth in order to provide a thorough understanding of the described embodiments of the present invention. However, it will be apparent to those skilled in the art that the described embodiments may be practiced with only some or all of the described aspects, and with or without some of the specific details. In some instances, descriptions of well-known features may be omitted or simplified so as not to obscure the various aspects and embodiments of the present invention.

Parts of the description will be presented using terminology commonly employed by those skilled in the art to convey the substance of their work to others skilled in the art, including terms of operations performed by or components included in an SVC system. As well understood by those skilled in the art, the operations typically involve examining, storing, transferring, combining, and otherwise manipulating data associated with an SVC. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Figure 1:
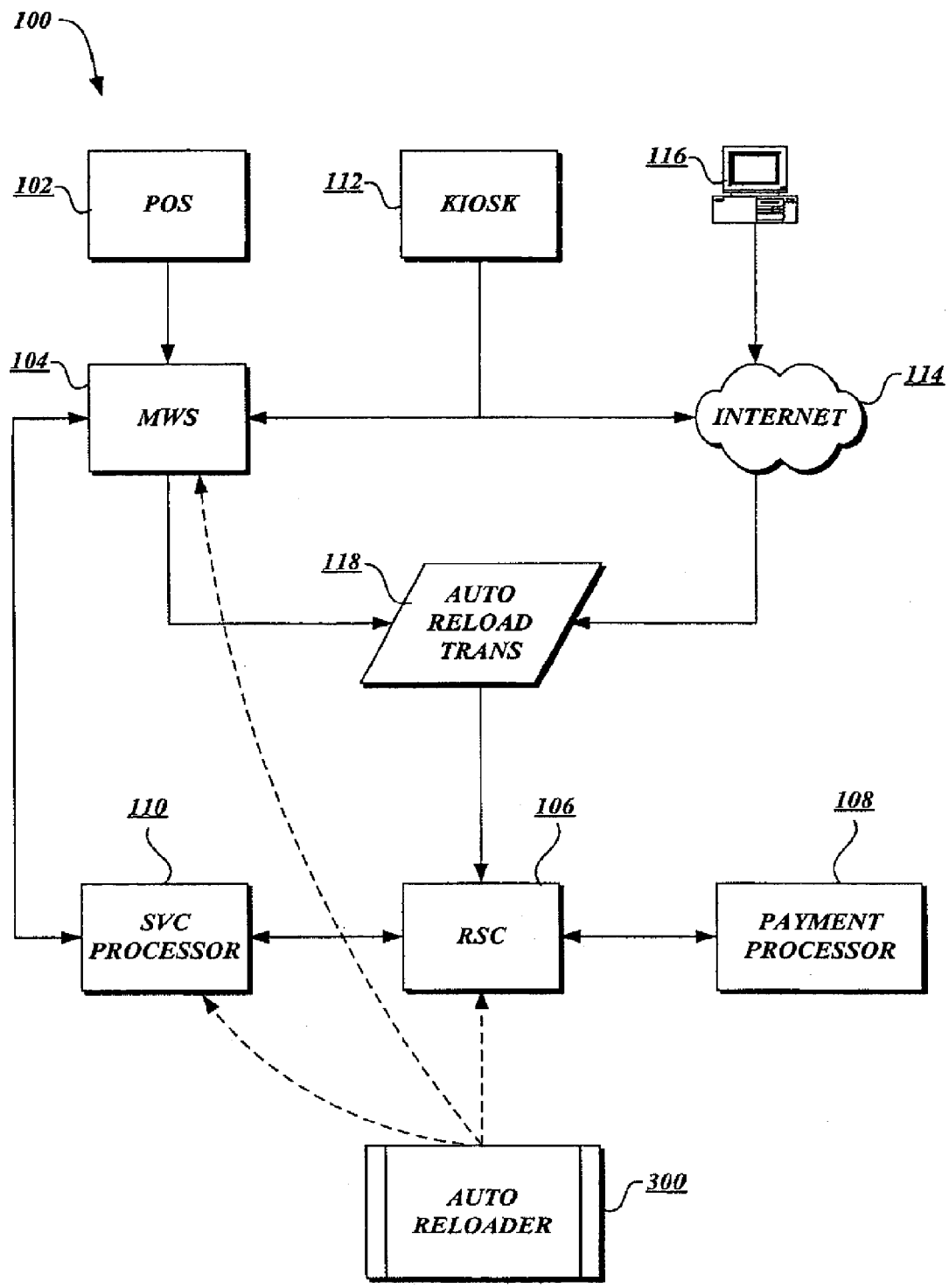
FIG. 1 is a block diagram illustrating a generalized overview of a stored value card (SVC) system incorporating an automatic SVC reloading process formed in accordance with the invention.

FIG. 1 is a block diagram illustrating a generalized overview of a stored value card (SVC) system 100 incorporating an automatic SVC reloader 300 formed in accordance with the invention, and the operating environment in which certain aspects of the automatic SVC reloader 300 may be practiced. In one embodiment, the cash balance of the account associated with the SVC is incremented by the automatic SVC reloader 300 by the pre-authorized reload amount whenever certain events relating to the use of the card are triggered. The pre-authorized amount is automatically paid using a pre-authorized payment method. The triggering events include, but are not limited to, reloading the card whenever the cash balance reaches or falls below a threshold level, or periodically on a particular day of the week or month. Automatically reloading an SVC card substantially increases the likelihood that the SVC card account will have a sufficient cash balance whenever the user presents the SVC card to a merchant for payment. Maintaining a sufficient cash balance in accordance with one embodiment of the invention is advantageous for both the SVC user as well as the merchant. The SVC user is not inconvenienced by running short of funds, and the merchant typically experiences increased sales activity. In addition, the amount of time needed to transact the sale is substantially reduced. Moreover, the ability to automatically reload an SVC card in accordance with one embodiment of the invention provides the merchant with opportunities to create innovative marketing and incentive programs related to the use of the card.

Before an SVC can be automatically reloaded with additional funds, the SVC must first be purchased. Using the SVC system 100 shown in FIG. 1, a customer can purchase an SVC in any denomination. Although in some embodiments of the present invention, a minimum amount such as $5.00 and a maximum amount such as $500.00, is placed on purchase. Each SVC is assigned a unique account number and includes a unique card identification number (CIN). The CIN may be used by the SVC holder after purchase to perform certain actions such as requesting automatic reload of the SVC, as will be described in more detail below. In one embodiment, the CIN is concealed until after purchase by a layer of opaque coating. The SVC holder may reveal the CIN by scratching off the coating after completing the purchase and physically obtaining the card.

As shown in FIG. 1, the SVC system 100 may include a point-of-sale (POS) terminal 102 located at a retail store. The POS terminal is a computerized transaction system including a touch screen display, a debit/credit card reader, a cash drawer and a receipt printer. The POS terminal 102 also includes the necessary computer software and hardware for initiating debit/credit card transactions as is well known in the art. For purposes of SVC transactions (e.g., purchase transactions or automatic reload transactions), the POS terminal also includes the computer hardware and software necessary for initiating SVC transactions, as will be described in more detail below.

The customer requests to purchase an SVC by presenting the SVC to, or requesting an SVC from, a sales clerk operating the POS terminal 102. The customer requests that a certain dollar amount or "value" be "stored on" a stored value card. In other words, the customer requests that the card be activated and that the requested dollar amount or "value" be added to an account to which the SVC account number has been assigned.

The POS terminal 102 initiates an SVC purchase transaction by sending SVC purchase transaction information to a managerial workstation (MWS) 104 typically located in the retail store. Since there may be more than one POS terminal 102 located in a retail store, each POS terminal 102 is typically connected via a local area network to the MWS 104. Upon receipt of the SVC purchase transaction information, the MWS 104 sends the transaction information to a centralized retail support center (RSC) server 106, e.g., via a wide area network connection. The RSC server 106 then transmits the SVC purchase transaction information to an SVC processor server 110 that processes the transaction and adds the requested value to an account to which the SVC account number is assigned. The SVC processor server 110 does not, however, cause any funds to be transferred between the customer and the retail store. Such funds transfer is caused upon completion of a tender or payment transaction. More specifically, upon completion of the purchase transaction by the SVC processor server 110, the POS terminal 102 initiates a payment transaction, i.e., either a debit/credit transaction or cash transaction, in order to secure payment for the card. If a debit/credit transaction is initiated, the POS terminal 102 obtains debit/credit card approval from a payment processor server 108 via the MWS 104 and RSC server 106. If the payment transaction is a cash transaction, the sales clerk simply enters the cash amount paid via the touchscreen of the POS terminal 102 and deposits the cash in the cash drawer.

Those skilled in the art will recognize that in other embodiments of the present invention, SVC purchase transactions, automatic reload transactions (as will be described below) and/or payment transactions could be sent directly from the POS terminal 102 to the RSC server 106, rather than being routed through the MWS 104. Further, in yet other embodiments of the present invention, the purchase transaction or automatic reload transaction could be communicated directly from the POS terminal 102 to the SVC processor server 110, and the payment transaction could be communicated directly from the POS terminal 102 to the payment processor server 108, rather than routed through the RSC server 106.

Once an SVC has been purchased and thus activated, the SVC holder, or other party associated with the SVC, such as an individual or corporation underwriting the card on behalf of the holder as a gift or benefit, may request that the SVC card (or more specifically, the SVC account associated with the SVC) be automatically reloaded in accordance with certain account preferences designated by the card holder or other party associated with the card. When choosing account preferences for the automatic reload option, the SVC holder may specify pre-authorized reload amounts, payment methods, and/or triggering events for adding additional funds to the SVC account. In alternative embodiments, the SVC account preferences for a given SVC card may be predetermined by the original SVC purchaser, e.g., a corporate sponsor, for a limited time period, such as when an SVC is issued as a gift.

Figure 7:
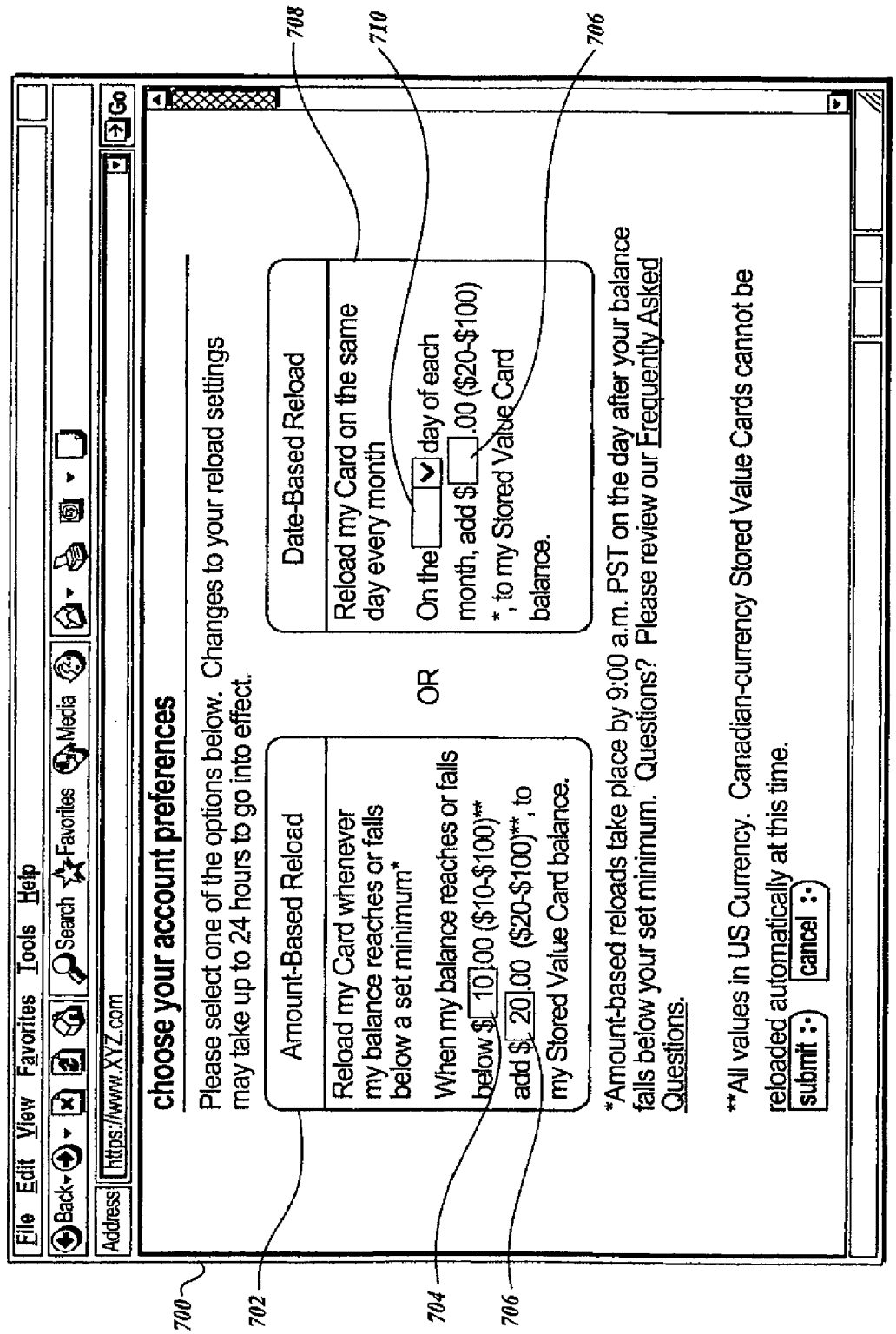
FIGS. 7-9 illustrate one embodiment of a user interface used by an SVC holder to choose account preferences that will be used by the automatic SVC reloading process illustrated in FIGS. 1 and 3 to automatically reload the SVC holder's account.
Figure 8:
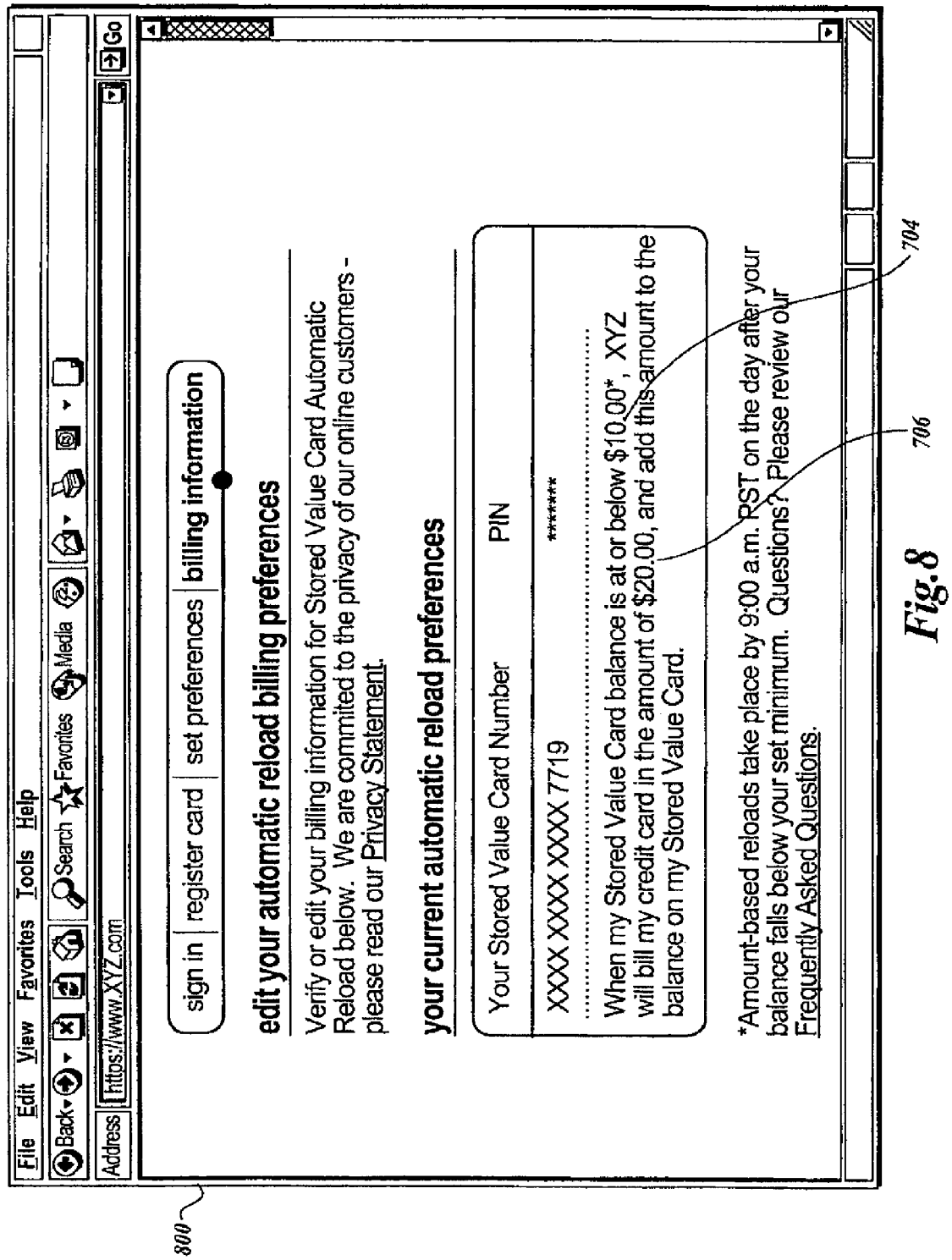

Returning to FIG. 1, the request to automatically reload the SVC may be initiated via a Web site hosted by the RSC 106 and accessed by a browser installed on a personal computer 116 or other computing devices (such as a laptop computer, tablet computer, telephone, personal digital assistant, etc.) that is communicatively coupled the Internet 114 or other wired or wireless communication network. For example, as will be described in more detail below, an SVC holder may go to the retail store Web site, register the SVC account, and designate, via the Web site's user interface his, or her account preferences, i.e., the circumstances or events under which the SVC should be reloaded. Examples of such a user interface are depicted in FIGS. 7 and 8 and will be described in more detail below. In other embodiments of the present invention, the request to automatically reload the SVC may be initiated at a kiosk 112 communicatively connected to the remainder of the SVC system 100 via the Internet 114, the MWS 104, and/or some other communication network. In yet other embodiments of the present invention, the request to automatically reload the SVC account may be initiated at the POS terminal 102.

The request to automatically reload the SVC is communicated to the RSC 106 from the POS 102, kiosk 112 or computer 116 in the form of an automatic reload transaction 118, referred to herein as an auto reload transaction 118. The auto reload transaction 118 may be transmitted in any format, either in single or multiple transmissions, as long as the transaction is capable of being processed by the automatic SVC reloader 300, and conveys to the RSC 106 preferences relating to how, whether, and when a particular SVC should be automatically reloaded. In the illustrated embodiment, the automatic SVC reloader 300 resides on the RSC server 106 and controls the automatic reloading function. However, those skilled in the art will appreciate that in other embodiments, the automatic SVC reloader 300 may reside on the SVC processor 110 and/or MWS 104, without departing from the scope of the claims that follow.

Upon receipt of the automatic reload transaction 118 by the RSC 106, the automatic SVC reloader 300 stores the preferences relating to how, whether, and when a particular SVC should be automatically reloaded into an automatic reload profile. If, as will be described in more detail below, the automatic SVC reloader 300 subsequently determines that a particular SVC should be automatically reloaded in accordance with the previously stored preferences, the automatic SVC reloader 300 initiates a process to cause additional funds to be added to the SVC holder's account. In the illustrated embodiment, the RSC 106 provides another automatic reload transaction 118 to the SVC processor 110 containing the pre-authorized reload amount, payment methods, and billing information as obtained from the previously stored preferences in the automatic reload profile. The SVC processor 110 completes the automatic reload transaction by adding the additional funds to the SVC holder's account.

The SVC automatic reloader 300 further causes the generation of a payment transaction for the pre-authorized reload amount. In the illustrated embodiment, the RSC 106 generates the payment transaction, e.g., a debit/credit transaction, and submits the payment transaction to the payment processor 108 for approval. Once approved or denied, the SVC automatic reloader 300 may further cause the generation of a notification to the party associated with the SVC that the card has been reloaded or not reloaded, as may be the case. For example, in the illustrated embodiment, the RSC 106 may generate an electronic mail message to be delivered to the SVC card holder via the Internet 114.

Figure 2:
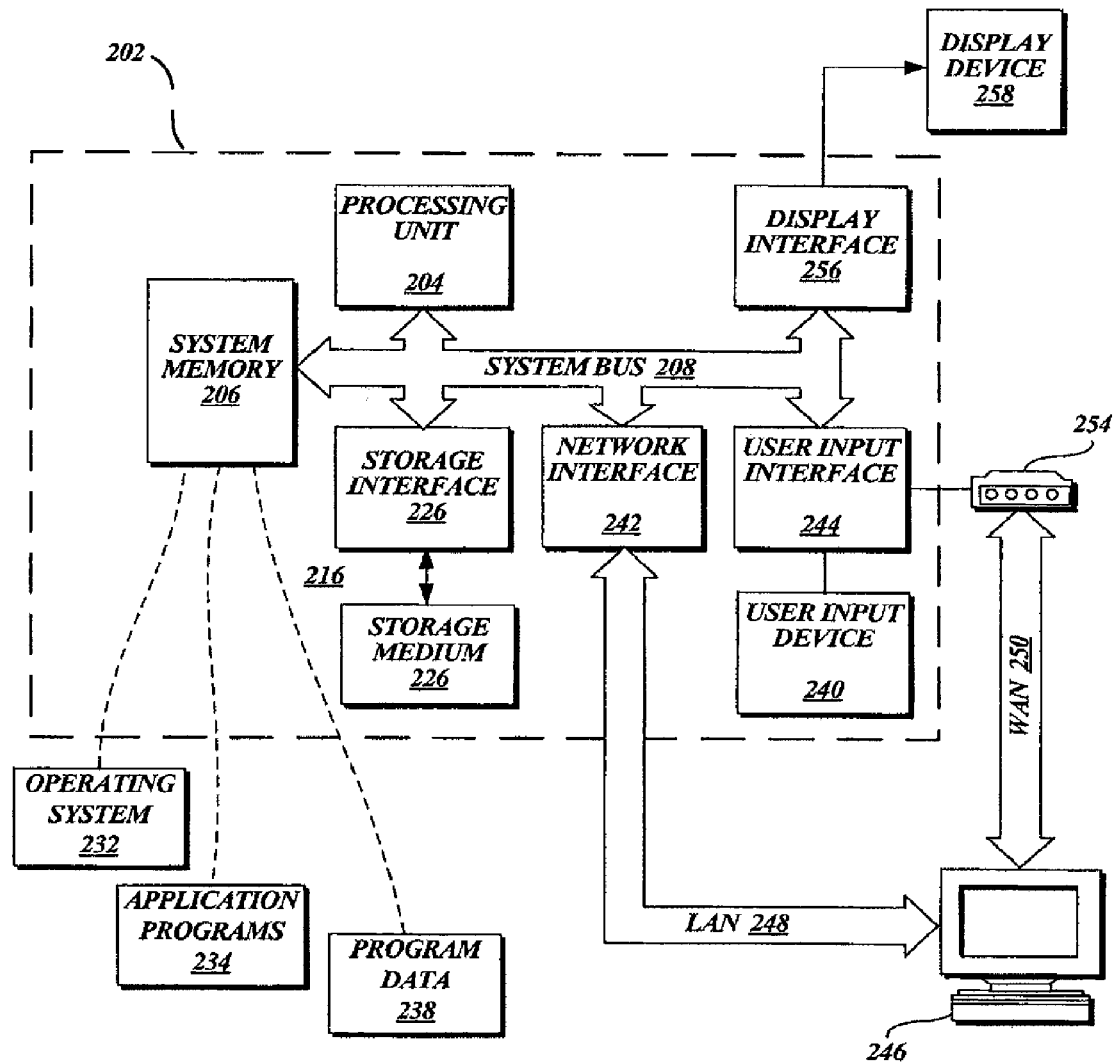
FIG. 2 is a block diagram of a server that may execute the automatic SVC reloading process in accordance with the present invention.

FIG. 2 illustrates a typical server, e.g., RSC 106, upon which the automatic SVC reloader 300 may be installed. FIG. 2 and the following discussion are intended to provide a brief, general description of a computing system suitable for implementing various features of the invention. While the computing system will be described in the general context of a server computer usable as a stand-alone computer, or in a distributed computing environment where complementary tasks are performed by remote computing devices linked together through a communication network, those skilled in the art will appreciate that the invention may be practiced with many other computer system configurations, including multiprocessor systems, minicomputers, mainframe computers, and the like. In addition to the more conventional computer systems described above, those skilled in the art will recognize that the invention may be practiced on other computing devices with sufficient memory and computing power.

While aspects of the invention may be described in terms of programs executed by a server computer, those skilled in the art will recognize that those aspects also may be implemented in combination with other program modules. Generally, program modules include routines, programs, components, data structures, etc., that perform particular tasks or implement particular abstract data types.

With reference to FIG. 2, server computer 202 includes a processing unit 204, a system memory 206, and a system bus 208 that couples the system memory to the processing unit 204. The system memory 206 includes read-only memory (ROM) and random-access memory (RAM). The system memory 206 contains the operating system 232 and other routines to operate the personal computer 202. The server computer 202 further includes a storage medium 216 connected to the system bus 208 by a storage interface 226. The storage medium 216 may include any type and/or combination of computer-accessible media including magnetic and optical media, removable and non-removable media, hard disks, CD-ROMS, magnetic cassettes, flash memory cards, digital video disks, Bernoulli cartridges, ZIP disks, and the like. The computer-readable media provide nonvolatile storage for the server computer 202.

A number of program modules may be stored in the storage medium 216 and system memory 206, including an operating system 232, one or more application programs 234 such as the application programs comprising the automatic SVC reloader 300, and program data 238, such as the program data comprising the data related to an SVC account.

A user may enter commands and information into the server computer 202 through input devices 240 such as a keyboard, mouse, or the like. These and other input devices are often connected to the processing unit 204 through a user input interface 244 that is coupled to the system bus, but may be connected by other interfaces (not shown), such as a universal serial bus (USB).

A display device 258 is also optionally connected to the system bus 208 via a display interface 256. While illustrated as a stand-alone device, the display device 258 could be integrated into the housing of the server computer 202. Furthermore, in other computing systems suitable for implementing the invention, the display could be overlaid with a touch-screen. In addition to the elements illustrated in FIG. 2, server computers may also include other peripheral output devices (not shown), such as speakers or printers.

The server computer 202 may operate in a networked environment using logical connections to one or more remote computers, such as a remote computer 246. The remote computer 246 may be another server, a personal computer, a router, a peer device, or other common network node, and typically includes many or all of the elements described relative to the server computer 202. The logical connections depicted in FIG. 2 include a local area network (LAN) 248 and a wide area network (WAN) 250. Such networking environments are commonplace in offices, enterprise-wide computer networks, intranets, and the Internet. It should be appreciated that the connections between one or more remote computers in the LAN 248 or WAN 250 may be wired or wireless connections, or a combination thereof.

When used in a LAN networking environment, the server computer 202 is connected to the LAN 248 through a network interface 252. When used in a WAN networking environment, the server computer 202 may include a modem 254 or other means for establishing communications over the WAN 250, such as the Internet. The modem 254, which may be internal or external, is connected to the system bus 208 via the user input interface 244. In a networked environment, program modules depicted relative to the server computer 202, or portions thereof, may be stored in a remote memory storage device. It will be appreciated that the network connections shown are exemplary and other means of establishing a communication link between the computers may be used. In addition, the LAN 248 and WAN 250 may be used as a source of nonvolatile storage for the system.

Figure 3:
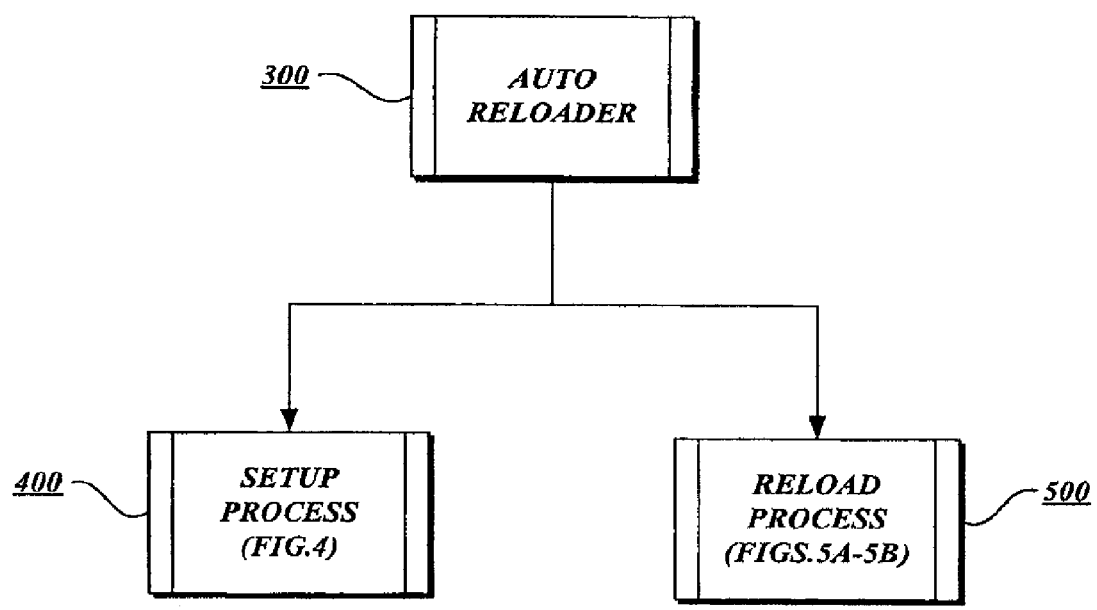
FIG. 3 is a block diagram illustrating a generalized overview of an automatic SVC reloading process formed in accordance with the present invention.

FIG. 3 illustrates a generalized overview of an automatic SVC reloader 300 formed in accordance with one embodiment of the invention and installed on a server (e.g., RSC 106) such as that shown in FIG. 2. In the illustrated embodiment, the automatic SVC reloader 300 comprises a setup process 400 and an automatic reload process 500. The setup process 400 controls the request for automatic reloading of a particular SVC and the designation of certain automatic reload preferences, whereas the automatic reload process 500 controls the actual reloading of the SVC in accordance with the previously designated automatic reload preferences.

Figure 4:
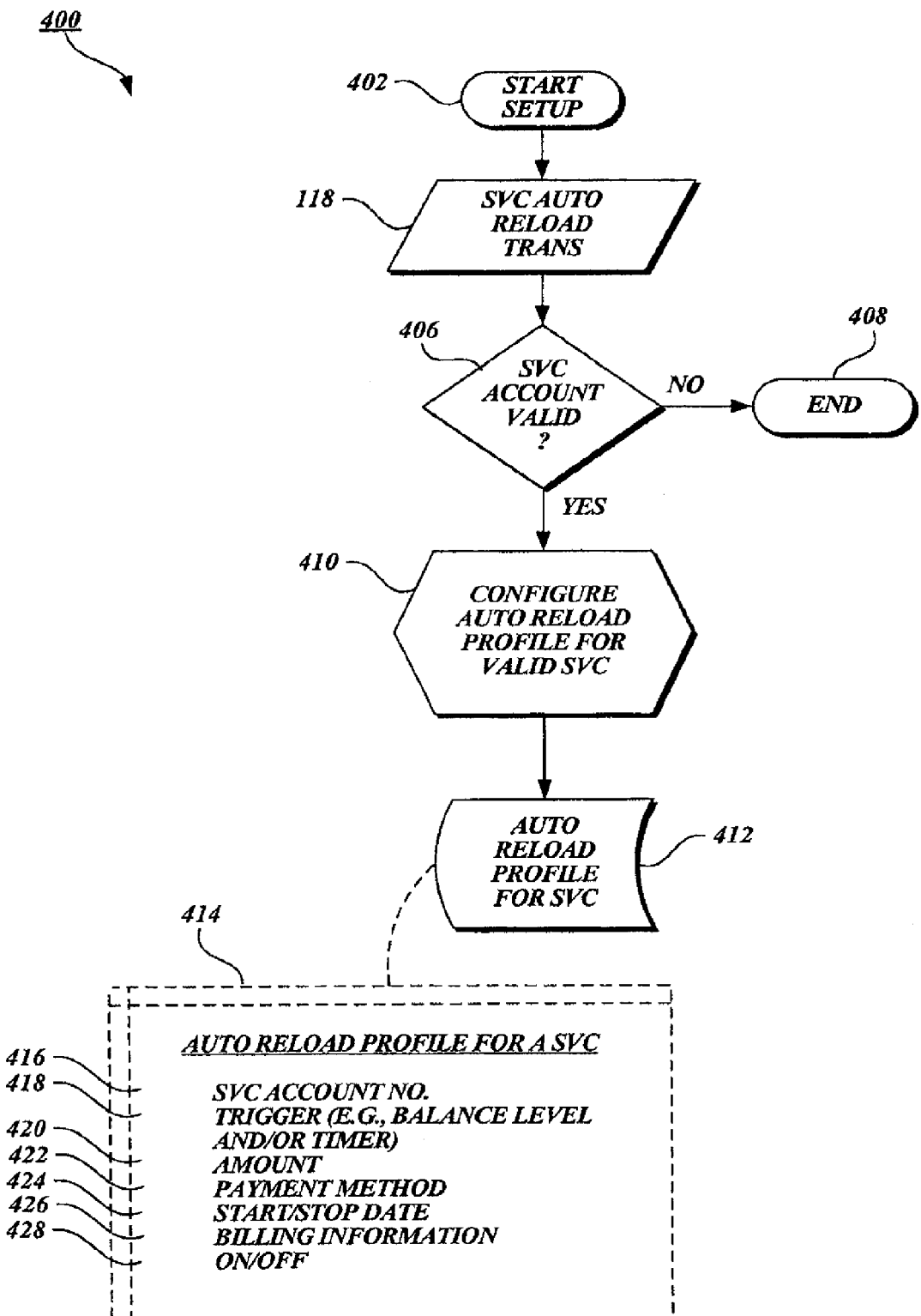
FIG. 4 is a flow diagram illustrating one embodiment of a setup subroutine performed by the automatic SVC reloading process illustrated in FIGS. 1 and 3.

FIG. 4 is a flow diagram illustrating one embodiment of the setup process 400. The setup process 400 begins at start block 402 with the receipt of an automatic reload transaction 118, the generation of which was previously described in FIG. 1. The setup process 400 continues at decision block 406 to determine whether the automatic reload transaction 118 is for a valid SVC account. An SVC account is valid if active (as opposed to closed, frozen, etc.) and if the correct SVC account number and CIN combination has been provided. If the SVC account is active, but the CIN is invalid, the SVC account is considered invalid. Hence, if the SVC account is invalid, the setup process 400 ends at termination block 408. For valid SVC accounts, the setup process 400 continues at preparatory block 410 to configure an automatic reload profile 412, referred to herein as an auto reload profile, for the valid SVC account.

In one embodiment, the auto reload profile 412 comprises profile data 414, including an SVC account number 416 associated with the valid SVC account, and numerous data values comprising the automatic reload preferences entered by the SVC holder, e.g., via the user interface described in more detail below in connection with FIGS. 7 and 8. The data values may include, but are not limited to, one or more trigger events 418, a reload amount 420 by which to increment the balance of the SVC account during the automatic reloading process, a payment method 422 used to authorize the payment for the reload amount 420, any start and stop dates 424 used to control when to enable and disable the performance of the automatic reload process 500, the billing information 426 related to the payment method 422, and an on/off indicator 428, also used to control when to enable and disable the performance of the automatic reload process 500. As will be described in more detail below, the profile data 414 is used to enable, disable, or otherwise control the operation of the automatic reload process 500.

In an embodiment of a batch processing implementation, the automatic SVC reloader 300 and auto reload profile 412 are stored on the RSC 106, and the auto reload profile 412 is transmitted to the MWS 104 or the SVC vendor 110, as needed to perform the automatic reload functions of the automatic reload process 500 on a periodic basis, e.g., once per pay. Alternatively, the auto reload profile 412 may be stored and used exclusively by the RSC 106. Other configurations to store and transmit the auto reload profile 412 may be employed without departing from the scope of the claims that follow.

For example, in a real-time implementation of the automatic SVC reloader 300, the setup process 400 and auto reload profile 412 may reside on the MWS 104 or RSC 106, but the reload process 500 may reside on the SVC processor 110 so that the SVC processor 110 may implement the automatic reloading functions in real-time. In yet other embodiments, the setup process 400, auto reload profile 412 and the reload process 500 may all reside on the SVC processor 110 so that the SVC processor 110 controls both the setup and reload functions of the present invention in real time.

Similar to the batch implementation, in a near-real time implementation, the automatic SVC reloader 300 and the auto reload profile 412 may reside on the RSC 106. However, reload may occur at a greater frequency, e.g., more than once per day, than in the batch implementation. Those skilled in the art will recognize that the auto reload profile 412 and the automatic SVC reloader 300 may reside on any component of the SVC system 100 deemed suitable, depending on, for example, the transaction processing speed desired (e.g., batch, real time or near-real time). Moreover, the components of the automatic SVC reloader 300 (i.e., the setup process 400 and the reload 500) may be separated and stored on different components of the SVC system 100, also depending on design requirements, without departing from the scope of the claims that follow.

Figure 5A:
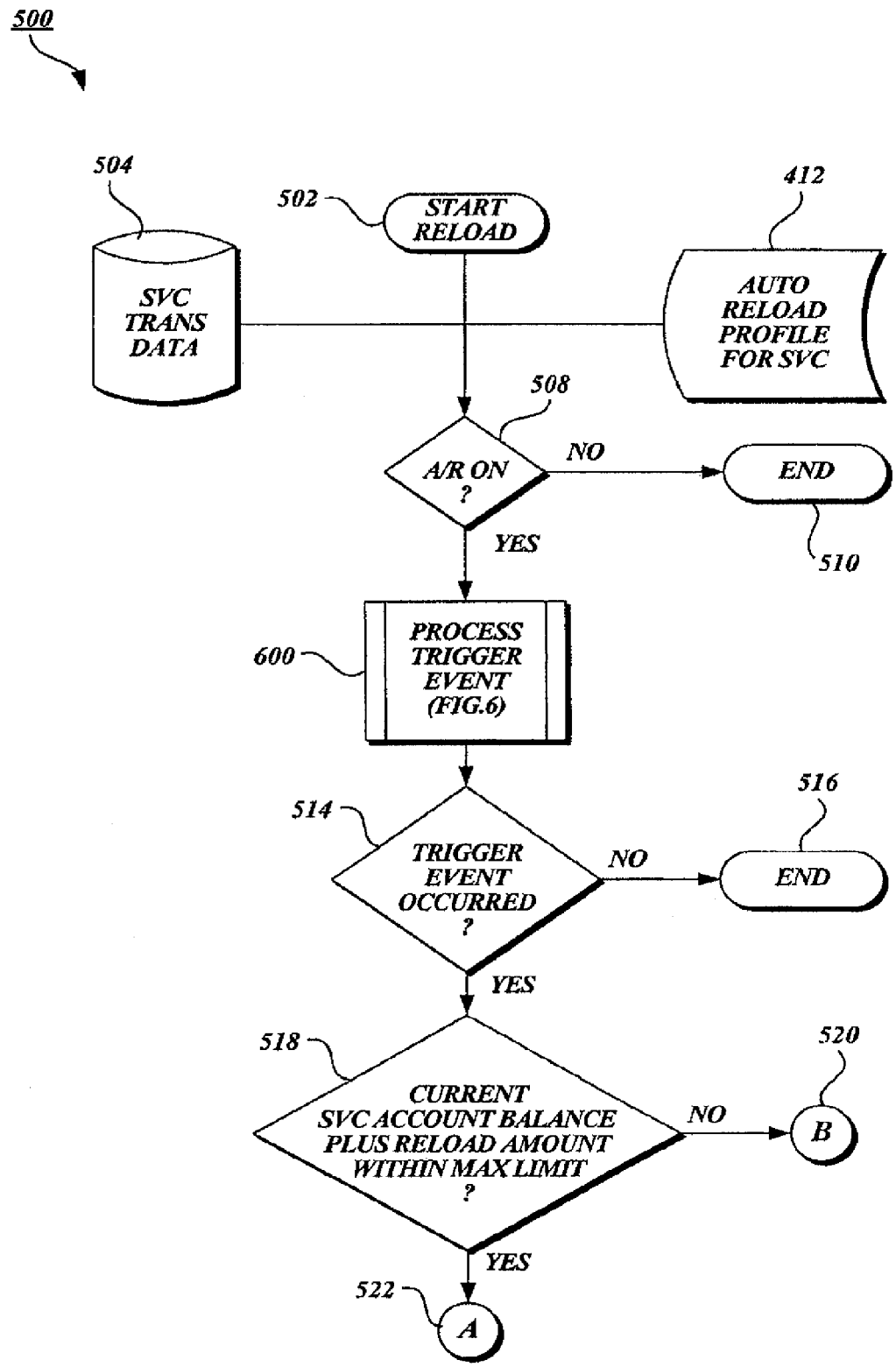
FIGS. 5A-5B are a flow diagram illustrating one embodiment of a reloading subroutine performed by the automatic SVC reloading process illustrated in FIGS. 1 and 3.
Figure 5B:
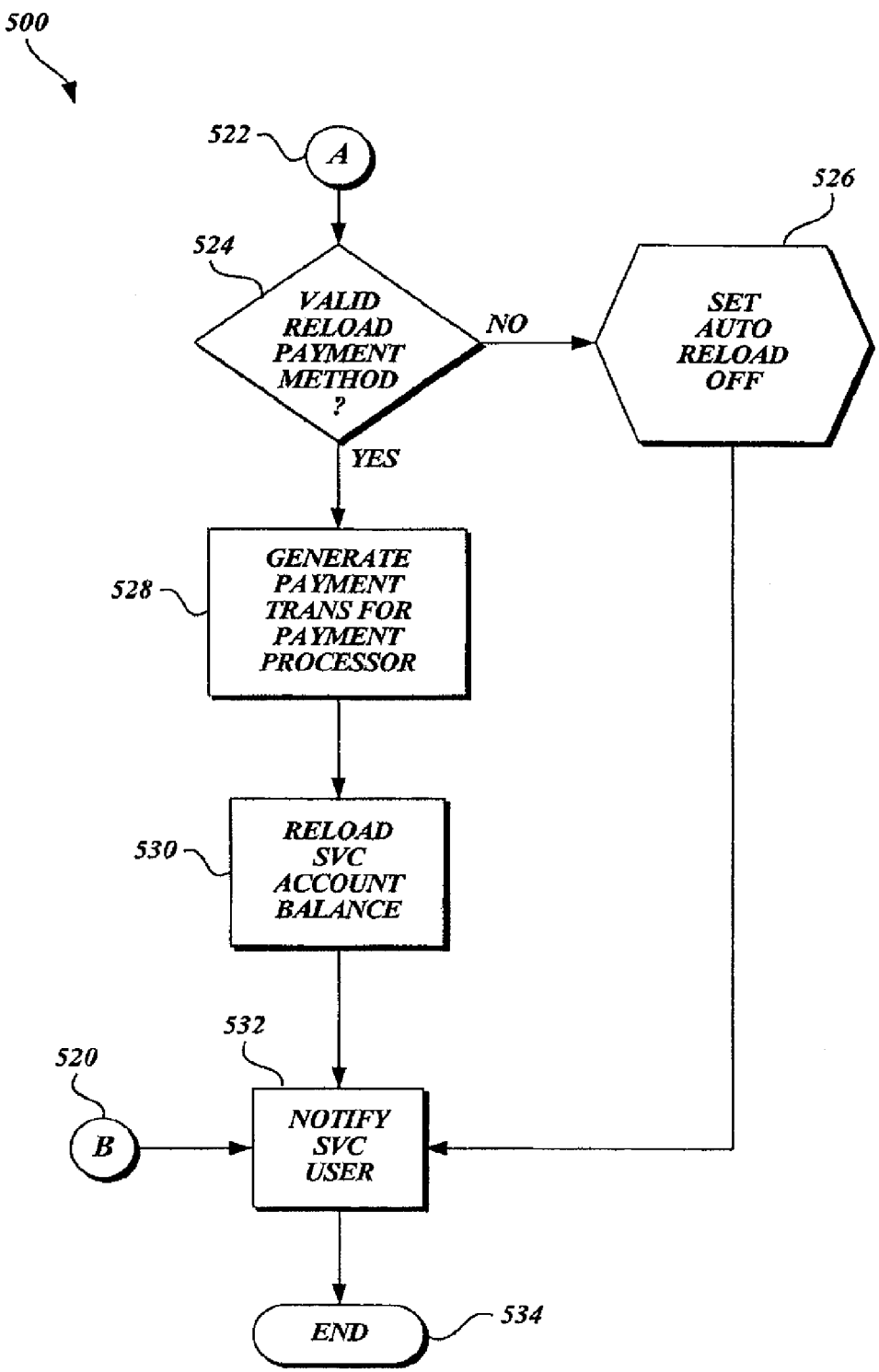

Now that the setup process 400 has been described, the automatic reload process 500 of the automatic SVC reloader 300 will be described in more detail. FIGS. 5A-5B are a flow diagram illustrating one embodiment of the automatic reload process 500 of the automatic SVC reloader 300 illustrated in FIGS. 1 and 3. In particular, FIGS. 5A-5B illustrate certain aspects of the auto reload process 500 used to reload a particular SVC account in accordance with the previously specified automatic reload preferences.

As noted in FIG. 4, once the automatic reload transaction 118 has been processed, the automatic reload preferences are stored in the auto reload profile 412. The SVC account is now ready to be automatically reloaded by the automatic reload process 500. The auto reload process begins in a block 502, and receives SVC transaction data 504 for an SVC account that may be in need of reloading from an SVC transaction data repository. The SVC transaction data 504 represents the current status of SVC accounts. As purchases are made with an SVC, the SVC account balance is debited to reflect those purchases and the data may be made available to the automatic reload process 500 in real-time, near real-time, or batch mode.

For example, in batch mode implementation, the SVC transaction data 504 for multiple SVC accounts is provided to a RSC 106 in a batch at predetermined intervals. When received, the auto reload process 500 reviews the SVC accounts to determine which ones may be eligible for automatic reloading. The account balances of those accounts determined to be eligible for automatic reloading are incremented prior to the next batch interval. In a real-time implementation, the SVC transaction data 504 for individual SVC accounts is provided on demand to the auto reload process 500, such as when the SVC is presented at a POS location to pay for merchandise. When the SVC account is determined to be eligible for automatic reloading, the account balance is incremented immediately. In a near real-time implementation, the SVC transaction data 504 for individual SVC accounts may also be provided on demand to the automatic reload process 500, such as when the SVC is presented at a POS location to pay for merchandise. However the account balance may not be incremented immediately, but rather a short time later, preferably prior to the next presentment of the SVC at a POS location.

Regardless of the mode of implementation, the auto reload process 500 continues at decision block 508 to determine from the preferences stored in the auto reload profile 412 whether automatic reloading functionality is currently enabled for the SVC account in question. As shown in FIG. 5A, when the on/off indicator 428 of the auto reload profile 412 is on, then automatic reloading is enabled. The on/off indicator 428 typically represents the actions of the SVC holder in the account preferences to select or not select the automatic reloading option. However, as explained in more detail below, in some cases the on/off indicator 428 may represent an action taken by the auto reload process 500 to disable automatic reloading due to problems encountered with the payment method or other data associated with the SVC.

Alternate embodiments may employ other means of determining whether automatic reloading functionality is currently enabled without departing from the scope of the claims that follow. For example, the start and stop date 424 may be stored in the profile 412 when the SVC is underwritten by a third party as a gift or promotional card. In that case, the auto reload process 500 determines whether automatic reloading functionality is currently enabled by examining whether the current date is after the start date, or within the range indicated by the start and stop dates as appropriate.

Once the automatic reload process 500 determines that automatic reloading functionality is enabled for the SVC account in question, the process continues at block 600 to perform trigger event processing. Trigger event processing is described in further detail below in FIG. 6 and results in a flag indicating whether or not a trigger event (e.g., account balance has fallen below predetermined threshold, the reload date has occurred, etc.) has occurred.

Figure 6:
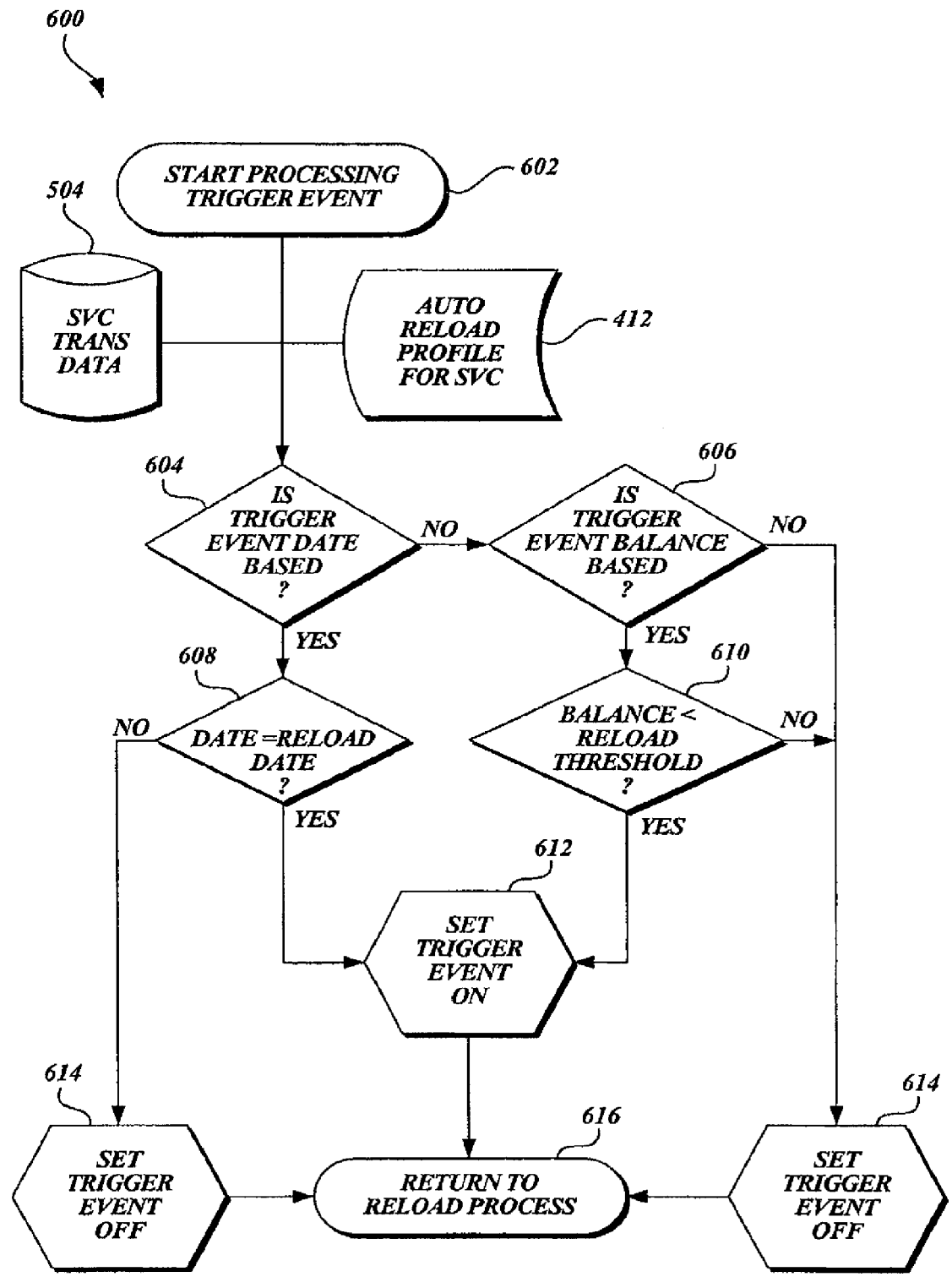
FIG. 6 is a flow diagram illustrating one embodiment of a trigger event processing subroutine performed by the reloading subroutine illustrated in FIGS. 5A and 5B.

As shown in FIG. 6, the trigger event process 600 begins at start block 602 and proceeds to decision blocks 604 and 606 to determine whether the trigger event to be examined is date-based or balance-based, respectively. Whether the trigger event is date-based or balance-based is determined by the trigger data 418 specified in the auto reload profile 412 for the SVC in question. Of course, it is understood that other bases for a triggering event, or combinations of two or more triggering events may be employed without departing from the scope of the claims that follow. For example, in some embodiments the triggering event might not be based strictly on the current date or the current balance, but rather based on a promotion that combines the two by rewarding a target number or dollar amount of purchases made with the SVC within a certain time frame.

In the illustrated embodiment, the trigger event process 600 determines if the trigger event 418 stored in the auto reload profile 412 is a date-based trigger event. In other words, the trigger event process 600 determines whether the SVC holder set an account preference to automatically reload his or her account upon a particular date and/or time. If so, the trigger event process 600 continues at decision block 608 to determine whether the current date is equal to the reload date specified by trigger event 418 stored in profile 412 for the SVC in question. This includes, for example, determining whether the current date is a certain day of the week or month that matches the reload preferences represented in the trigger data 418 of the auto reload profile 412, such as Monday of each week, or the first of each month, etc.

If the trigger event is not date-based, the trigger event process 600 continues to decision block 606 to determine if the trigger event is balance-based. In other words, the trigger event process 600 determines whether the SVC holder set an account preference to automatically reload his or her account based on a particular account balance. If so, the trigger event process 600 continues at decision block 610 to determine whether the current balance has fallen below a reload threshold balance specified by the trigger event data 418 of the auto reload profile 412 for the SVC in question. Other criteria for comparing the balances may be employed without departing from the claims that follow, such as determining instead whether the current balance has reached or fallen below the threshold amount.

Returning to decision block 606, if the trigger event is neither date- or balance-based, the illustrated embodiment of the trigger event processing subroutine 600 simply defaults to setting the trigger event flag off in a preparatory block 614.

When the trigger event process 600 has determined that the triggering event has occurred (e.g., current date equals reload in decision block 608 or current balance is less than reload a threshold in decision block 610), the process continues at preparatory block 612 to set the trigger event flag on. If such an event has not occurred, the process continues at preparatory block 614 to set the trigger event flag off. In either case, the trigger event process 600 returns in block 616 to complete the automatic reload process 500 picking up at decision block 514.

At decision block 514, the automatic reload process 500 determines whether the trigger event has occurred using the results from the trigger event processing subroutine 600. If not, the automatic reload process 500 ends at termination block 516 without reloading the SVC. The automatic reload process 500 can then be repeated for another SVC account.

If the trigger event has occurred, the automatic reload process 500 continues at decision block 518 to determine whether proceeding with incrementing the current SVC account balance with the reload amount 420 is within the maximum limit set by the SVC system 100 for the SVC. If not, the automatic reload process 500 continues to block 532 in FIG. 5B to notify the SVC user, typically the SVC card holder, that the auto reload process could not be completed because the maximum account balance allowed by the retailer would be exceeded.

Returning to decision block 518 in FIG. 5A, if the account balance incremented with the reload amount is within the predetermined maximum limit, the automatic reload process 500 continues at decision block 524 in FIG. 5B to determine whether the current payment method 422 stored in the auto reload profile 412 for this SVC account is still valid. For example, if the payment method is a credit card, the payment method is considered valid if the credit card is active (i.e., not expired, not frozen or in other ways inactivated by the card sponsor); the credit card account has sufficient credit line to cover the transaction; and the card verification number (CVN), zip code and expiration date match that on file with the payment processor. If not, the automatic reload process 500 continues at preparatory block 526 to set the profile's automatic reload on/off indicator 428 to the off setting, and at block 532 to notify the SVC user that the automatic reloading option has been suspended until they can provide a valid payment method.

After validating the payment method, the automatic reload process 500 continues at block 528 to generate a payment transaction for transmission to the payment processor 108. The payment transaction includes the payment method 422 and billing information 426 stored in the auto reload profile 412 and is used to obtain payment authorization for the reload amount 420. After receiving payment authorization, the automatic reload process 500 continues at block 530 to reload the SVC account by incrementing the account balance by the reload amount 420 as stored in profile 412. In one embodiment, the automatic reload process 500 reloads the SVC account by generating a reload request at block 530 which contains the SVC account number 416 and other data from the profile 412, such as the reload amount 420, payment method 422, and billing information 426, as appropriate. The automatic reload process 500 then transmits the reload request to the SVC processor 110 to increment the account balance. The automatic reload process 500 then continues at block 532 to notify the SVC user of the successful automatic reload of the SVC card. Such notifications typically serve to remind the holder of the outstanding unused and/or new balance remaining on the card. Processing then ends at termination block 534.

As noted above, a SVC holder may request to automatically reload an SVC via a Web site accessed by a browser installed on a computer 116 as shown in FIG. 1. FIGS. 7-8 illustrate exemplary user interface Web pages provided by such a Web site. It should be noted that the illustrated interfaces reflect just one embodiment of the present invention, and that other variations of the interfaces may be employed without departing from the scope of the claims that follow.

In one embodiment, an SVC account preferences input interface 700 is generated and displayed to the SVC holder as illustrated in FIG. 7. In this example, the SVC holder has navigated to the account preferences input interface 700 by previously selecting an automatic reload option for their SVC account. As shown, the account preferences input interface 700 comprises two input areas 702 and 708, in each of which the user can specify how and when to trigger the automatic reloading of their SVC account. In this example an amount-based triggering event input area 702 and a date-based triggering event input area 708 are provided.

Of course, it is understood that input interfaces for other kinds of triggering events may be provided in other embodiments without departing from the scope of the claims that follow, such as input interfaces (such as that shown in FIG. 9) for the time or dollar-based promotional triggers previously mentioned.

The amount-based area 702 includes a reload threshold input area 704 to enter the threshold dollar amount below which the holder's card should be automatically reloaded, as well as a reload amount input area 706 to enter the reload dollar amount that the holder authorizes for automatic reloading. As shown, the retailer has restricted the holder to a threshold amount between $10 and $100, and a reload amount between $20 and $100; however, other minimum and maximum amounts could be provided without departing from the scope of the claims that follow. This particular holder chose the minimum allowable threshold and reload amounts of $10 and $20, respectively. Once entered, the data is stored by the setup process 400 of the automatic SVC reloader 300 as trigger event data 418 and the amount data 422 in the auto reload profile 412 for the SVC described above.

The date-based area 708 includes a reload date input area 710 to enter a recurring date on which the holder's card should be reloaded. In the illustrated embodiment, the retailer has restricted the holder to a monthly reload date, but other date options could be provided without departing from the scope of the claims that follow. For example, the retailer might want to provide the holder with the option to specify a weekly reload date, or a bi-monthly date, or even a specific non-recurring future date during the year.

As with the balance-based area 702, the date-based area 708 also includes a reload amount input area 706 to enter the reload dollar amount that the user authorizes for automatic reloading. This retailer has restricted the holder to a reload amount between $20 and $100, however, other minimum and maximum amounts could be provided without departing from the scope of the claims that follow. Again, the entered data is stored by the setup process 400 of the automatic SVC reloader 300 as trigger even data 418 and the amount data 422 in the auto reload profile 412.

In one embodiment, an SVC account preferences query interface 800 is also generated and displayed to the SVC holder as illustrated in FIG. 8. In the illustrated example, the SVC holder has navigated to the account preferences query interface 800 by previously selecting the automatic reload option for their SVC account. As shown, the account preferences query interface 800 comprises, among other areas, an automatic reload preferences display area 802 in which the current automatic reload preferences previously entered in input areas 702 and 708 are displayed for review by the SVC holder. In this example, the holder's previously entered preferences entered in the reload threshold input area 704 and the reload amount input area 706 are displayed in the preferences display area 802 with the following text: "When my stored value card balance is at or below $10.00, retailer will bill my credit card in the amount of $20.00, and add this amount to the balance on my stored value card." The holder can navigate to other areas of the interface 800 to change the preferences or any of the billing information or other data associated with the SVC account.

Figure 9:
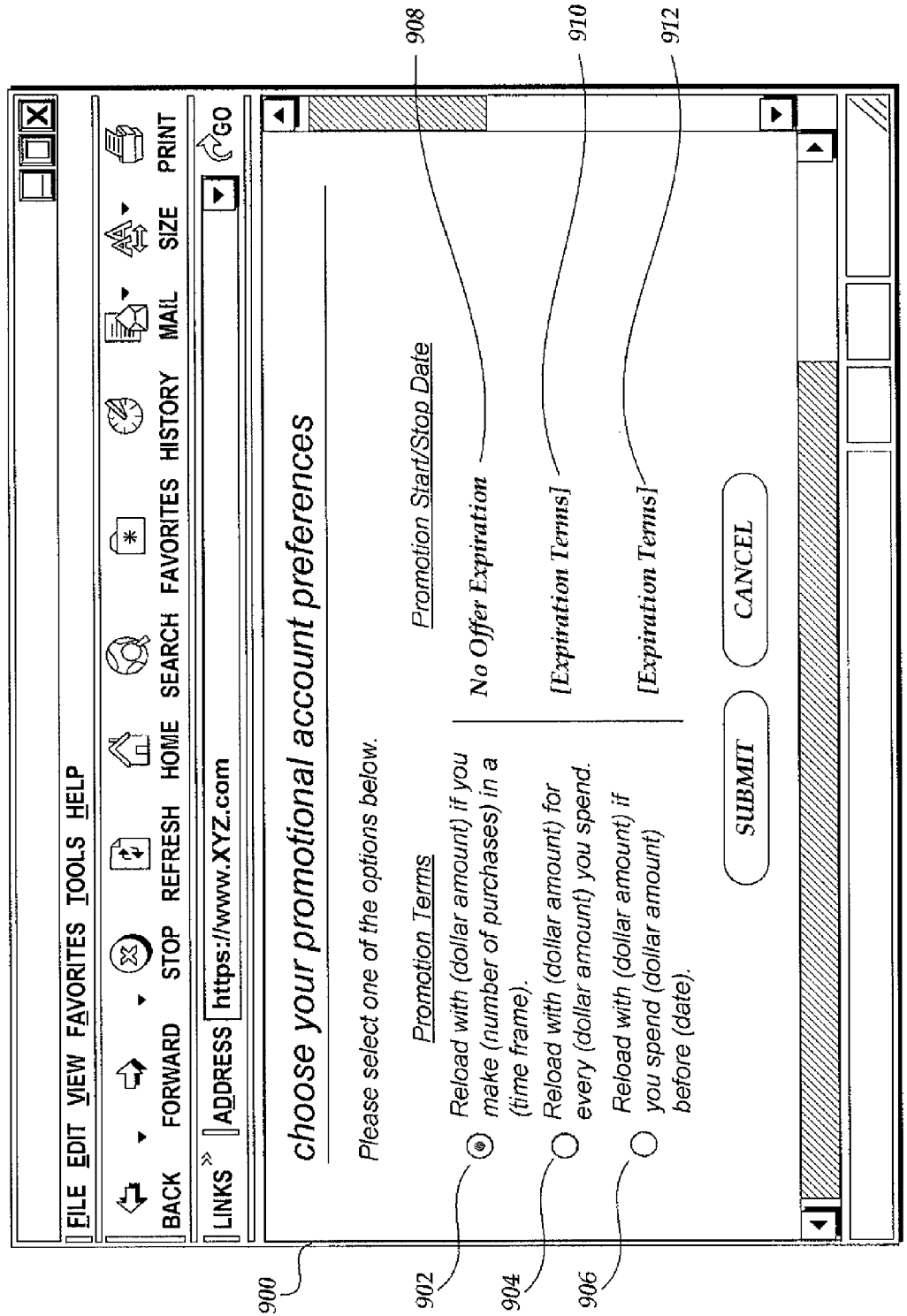

In one embodiment, an SVC account preferences input interface 900 is generated and displayed to the SVC holder as illustrated in FIG. 9. In the illustrated example, the SVC holder has navigated to the account preferences input interface 900 by previously selecting a promotional automatic reload option for their SVC account. As discussed earlier, promotions may be SVC account preferences predetermined by a card holder or other party associated with the card, such as a merchant, or an individual or corporation underwriting the card. As shown, the account preferences input interface 900 comprises three selectable input controls 902, 904, and 906, which by selecting, the user can specify a promotional goal and an amount for the promotional automatic reloading of his or her SVC account, where the amount has been pre-authorized by a party other than the holder of the SVC (e.g., an underwriting corporation.). Accordingly, when the promotional goal is satisfied, a balance of an account associated with the SVC is incremented (e.g., automatically reloaded) by the pre-authorized amount. Promotional goals may include, but are not limited to, a number or dollar amount of purchases made with a particular SVC card, a time based trigger, or some combination thereof as previously mentioned. In the illustrated example, a number-of-purchases and date-based promotion selectable input control 902, an amount-based promotion selectable input control 904, and an amount and date-based promotion selectable input control 906 are provided. In the illustrated example, each of these selectable input controls 902, 904, and 906 corresponds to a start/stop date 908, 910, and 912 respectively, which as discussed in FIG. 5 may be utilized by the auto reload process 500 to determine whether automatic reload functionality is currently enabled. Of course, it is understood that input interfaces for other kinds of promotional goals and amounts may be provided in other embodiments without departing from the scope of the claims that follow.

It will be appreciated by those skilled in the art that the account preference user interfaces may also be used for soliciting billing information 426 and payment method information 424 from the SVC holder, which information is also ultimately stored in the auto reload profile 412 by the setup process 400.

Having described and illustrated the principles of the invention with reference to illustrated embodiments, it will be recognized that the illustrated embodiments can be modified in arrangement and detail without departing from such principles. For example, while the foregoing description focused on automatic reloading of an SVC in the context of an SVC system implemented on a distributed interconnected network, it will be recognized that the above techniques and analyses can be applied to automatic reloading of an SVC system in other contexts such as an intranet or other closed system, and having comparable limitations. It will also be appreciated that the SVC system of the present invention may be used to automatically reload accounts in non-U.S. jurisdictions with non-U.S. currency.

Furthermore, even though the foregoing discussion has focused on particular embodiments, it is understood that other configurations are contemplated. For example, it is understood that the configuration of a SVC system 100 to implement a real-time embodiment of automatic reloading of an SVC may differ from the configuration for a batch mode embodiment. As another example, it is understood that the above-described user interfaces illustrated in FIGS. 7-8 are exemplary only, and that some embodiments may employ other interfaces, including non-graphical voice-activated interfaces used in conjunction with a telephone or other audio input device.

Consequently, in view of the wide variety of permutations to the above-described embodiments, the detailed description is intended to be illustrative only, and should not be taken as limiting the scope of the invention. It will be appreciated that various changes can be made therein without departing from the spirit and scope of the invention. What we claim as our invention, therefore, is all such modifications as may come within the scope of the following claims and their equivalents.

The embodiments of the invention in which an exclusive property or privilege is claimed are defined as follows:

1. A method for automatically reloading a stored value card (SVC), the method comprising:
  determining that an activity related to a stored value card (SVC) has satisfied a promotional goal, wherein the promotional goal is designated by a holder of the SVC independent of a purchase transaction using the SVC and following registration of the SVC, wherein the SVC is registered by the holder of the SVC using a unique card identification number that is different than an account number associated with the SVC;
  incrementing a balance of the account associated with the SVC by an amount pre-authorized by a party associated with the SVC other than the holder of the SVC, if it is determined that the activity related to the SVC has satisfied the promotional goal; and
  generating a notification to the holder of the SVC that incrementing the balance has occurred,
  wherein the method is implemented by at least one computing device.

2. The method of claim 1, wherein the activity of the SVC is a number of purchases made with the SVC, and the promotion goal is satisfied when the number of purchases reaches a specified number of purchases, after which the account earns an automatic reload of the pre-authorized amount.

3. The method of claim 1, wherein the activity of the SVC is a dollar amount purchased using the SVC, and the promotion goal is satisfied when the dollar amount reaches a specified dollar amount of purchases, after which the account earns an automatic reload of the pre-authorized amount.

4. The method of claim 1, further comprising:
  determining that incrementing the balance by the pre-authorized amount will cause the balance to exceed a maximum;
  one of suppressing incrementing the balance of the account altogether and incrementing the account by less than the pre-authorized amount up to the maximum balance; and
  further generating a notification to the holder of the account of at least one of that the account could not be automatically reloaded and that the maximum balance has been reached.

5. The method of claim 1, wherein at least one of determining, incrementing, and notifying are performed in real-time.

6. The method of claim 1, wherein at least one of determining, incrementing, and notifying are performed in near real-time.

7. The method of claim 1, wherein at least one of determining, incrementing, and notifying are performed periodically.

8. The method of claim 1, wherein at least one of determining, incrementing, and notifying are performed at a PUS location upon presentment of the SVC card.

9. The method of claim 1, wherein determining, incrementing, and notifying are performed prior to a next presentment of the SVC card.

10. The method of claim 1, further comprising:
  verifying whether the activity related to the SVC satisfied the promotional goal within a pre-determined range of time; and
  bypassing incrementing the balance when the promotional goal has not been satisfied within the pre-determined range of time.

11. An apparatus to automatically reload a stored value card (SVC), comprising:
  an event processor that:
    determines when a promotional goal pre-designated by a holder of an SVC has been satisfied; and
    triggers an automatic reload of the SVC wherein the SVC has been registered by the holder using a unique card identification number that is different than an account number associated with the SVC and wherein registration of the SVC using the unique card identification number:
      enables the holder of the registered SVC to pre-designate the promotional goal; and
      makes the SVC eligible for a promotional program;
  a payment processor to authorize payment for a reload amount authorized by a party other than the holder of the SVC, when the event processor triggers an automatic reload; and a reloader to increment an account balance of the registered SVC by the authorized reload amount.

12. The apparatus of claim 11, wherein the promotional goal is satisfied when an activity of the registered SVC has reached a threshold activity.

13. The apparatus of claim 12, wherein the threshold activity is a number of purchases made with the registered SVC.

14. The apparatus of claim 12, wherein the threshold activity is a dollar amount of purchases made with the registered SVC.

15. The apparatus of claim 11, further comprising a reload preference interface to setup the promotional goal according to an input to the interface.

16. The apparatus of claim 15, wherein the reload preference interface is a graphical interface accessible over the Internet.

17. The apparatus of claim 15, wherein the reload preference interface is an audio interface accessible over a telephone network.

18. The apparatus of claim 11, further comprising:
a notifier to notify a party associated with the registered SVC when the reloader increments the account balance of the registered SVC by the authorized reload amount.

19. The apparatus of claim 18, wherein the reloader is to increment the account balance of the registered SVC by less than the authorized reload amount up to a maximum account balance, and wherein the notifier is to further notify the party that the maximum account balance has been reached.

20. The apparatus of claim 11, wherein the reloader is to disable the automatic reload of the registered SVC when the payment processor cannot authorize payment for the reload amount.

21. A method for reloading a stored value card, comprising:
receiving a request to reload a registered stored value card (SVC), the request specifying an automatic reload preference that has been designated independent of a purchase transaction by a holder of the registered SVC and that has been designated following registration of the SVC using a unique card identifier that is different from an account number associated with the SVC, the automatic reload preference being a promotional goal;
incrementing a balance of an account associated with the registered SVC by an automatic reload amount authorized by a party other than the holder of the SVC, when the automatic reload preference is satisfied; and
confirming whether the request has been completed,
wherein the method is implemented by at least one computing device.

22. The method of claim 21, wherein the request was automatically generated after satisfaction of the automatic reload preference.

23. The method of claim 21, wherein incrementing the balance is performed only after determining that incrementing the balance does not cause the balance to exceed a predetermined maximum balance.

24. The method of claim 23, wherein confirming whether the request has been completed includes confirming that the request could not be completed because incrementing the balance would cause the balance to exceed the predetermined maximum balance.

25. The method of claim 21, further comprising:
generating a payment transaction for the reload amount indicated in the request; and
verifying whether the payment transaction was successfully completed.

26. The method of claim 25, wherein confirming whether the request has been completed includes confirming that the request could not be completed because the payment transaction was unsuccessful.

27. The method of claim 21, wherein confirming whether the request has been completed includes sending a notification to the requester.

28. The method of claim 21, wherein confirming whether the request has been completed includes sending a notification to the holder or purchaser of the registered SVC.

29. The method of claim 28, wherein the notification is an electronic mail message.

30. The method of claim 28, wherein the notification is an electronic transaction.

31. A non-transitory, computer-readable storage medium having executable instructions to reload a stored value card (SVC), the instructions comprising:
to determine that an activity related to a stored value card (SVC) has satisfied a promotional goal, wherein the promotional goal is designated by a holder of the SVC independent of a purchase transaction and following registration of the SVC with a provider of the SVC, wherein the SVC is registered using a unique card identifier different from an account number associated with the SVC;
to increment a balance of an account associated with the SVC by an amount pre-authorized by a party associated with the SVC other than the holder of the SVC, if it is determined that the activity has satisfied the promotional goal; and
to notify the holder of the SVC that the balance was incremented.

32. The non-transitory, computer-readable storage medium of claim 31, wherein the activity associated with using the SVC is a number of purchases made with the SVC, and the promotion goal is satisfied when the number of purchases reaches a specified number of purchases, after which the account earns an automatic reload of the pre-authorized amount.

33. The non-transitory, computer-readable storage medium of claim 31, wherein the activity associated with using the SVC is a dollar amount purchased using the SVC, and the promotion goal is satisfied when the dollar amount reaches a specified dollar amount of purchases, after which the account earns an automatic reload of the pre-authorized amount.

34. The non-transitory, computer-readable storage medium of claim 31, wherein the instructions further comprise:
to determine that incrementing the balance by the pre-authorized amount will cause the balance to exceed a maximum;
to one of to suppress incrementing the balance of the account altogether and to increment the account by less than the pre-authorized amount up to the maximum balance; and
to further notify the holder of the account of at least one of that the account could not be automatically reloaded and that the maximum balance has been reached.

35. The non-transitory, computer-readable storage medium of claim 31, wherein at least one of the instructions to determine, to increment, and to notify are performed in real-time.

36. The non-transitory, computer-readable storage medium of claim 31, wherein at least one of the instructions to determine, to increment, and to notify are performed in near real-time.

37. The non-transitory, computer-readable storage medium of claim 31, wherein at least one of the instructions to determine, to increment, and to notify are performed periodically.

38. The non-transitory, computer-readable storage medium of claim 31, wherein at least one of the instructions to determine, to increment, and to notify are performed at a POS location upon presentment of the SVC card.

39. The non-transitory, computer-readable storage medium of claim 31, wherein at least one of the instructions to determine, to increment, and to notify are performed prior to a next presentment of the SVC card.

40. The non-transitory, computer-readable storage medium of claim 31, wherein the instructions further comprise:
- to verify whether the activity satisfied the promotional goal within a pre-determined range of time; and
- to bypass incrementing the balance when the activity does not satisfy the promotional goal within the pre-determined range of time.

* * * * *

UNITED STATES PATENT AND TRADEMARK OFFICE
CERTIFICATE OF CORRECTION

PATENT NO. : 8,156,042 B2  
APPLICATION NO. : 10/926779  
DATED : April 10, 2012  
INVENTOR(S) : Nathaniel W. Winkelman, III et al.

It is certified that error appears in the above-identified patent and that said Letters Patent is hereby corrected as shown below:

On the Title page, Item (56):

At Page 2, under U.S. Patent Documents, at Col. 2, Line 39, please delete "2006/1006437 A1" and insert --2006/0064379 A1--.

At Page 2, under U.S. Patent Documents, at Col. 2, Line 40, please delete "2006/1016194 A1" and insert --2006/0161947 A1--.

In the Claims:

At col. 14, claim 11, line 54, delete "SVC" and insert --SVC,--.

At col. 14, claim 11, line 56, delete "SVC" and insert --SVC,--.

At col. 16, claim 28, line 10, delete "or purchaser" after --holder--.

Signed and Sealed this  
Fourth Day of December, 2012

David J. Kappos  
*Director of the United States Patent and Trademark Office*